(12) United States Patent
Lehr et al.

(10) Patent No.: US 8,527,551 B2
(45) Date of Patent: *Sep. 3, 2013

(54) PROCESSING OF SPLITS OF CONTROL AREAS AND CONTROL INTERVALS

(75) Inventors: Douglas Lee Lehr, Austin, TX (US); Franklin Emmert McCune, Tucson, AZ (US); David Charles Reed, Tucson, AZ (US); Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/533,641

(22) Filed: Jun. 26, 2012

(65) Prior Publication Data

US 2012/0278367 A1 Nov. 1, 2012

Related U.S. Application Data

(63) Continuation of application No. 12/834,648, filed on Jul. 12, 2010, now Pat. No. 8,290,987.

(51) Int. Cl.
*G06F 17/30* (2006.01)

(52) U.S. Cl.
USPC .......................................... 707/802

(58) Field of Classification Search
USPC ............................. 707/802, 999.1
See application file for complete search history.

(56) References Cited

U.S. PATENT DOCUMENTS

| | | | |
|---|---|---|---|
| 4,408,273 A | 10/1983 | Plow | |
| 5,355,477 A | 10/1994 | Strickland et al. | |
| 5,426,752 A | 6/1995 | Takahasi et al. | |
| 6,535,869 B1 | 3/2003 | Housel, III | |
| 6,691,121 B1 | 2/2004 | Heronimus et al. | |
| 7,158,999 B2 | 1/2007 | Pace et al. | |
| 7,266,552 B2 | 9/2007 | Schwarz et al. | |
| 7,624,127 B2 | 11/2009 | Smith | |
| 8,051,165 B2 | 11/2011 | Enqvist | |
| 8,095,768 B2 | 1/2012 | Lehr et al. | |
| 8,290,987 B2 * | 10/2012 | Lehr et al. | 707/802 |
| 2009/0157762 A1 | 6/2009 | Yerneni et al. | |
| 2010/0030828 A1 | 2/2010 | Chauvet et al. | |
| 2010/0077255 A1 | 3/2010 | Lehr et al. | |
| 2010/0094811 A1 | 4/2010 | Lehr et al. | |
| 2011/0238638 A1 | 9/2011 | Thompson | |
| 2012/0011169 A1 | 1/2012 | Lehr et al. | |

OTHER PUBLICATIONS

D. Lovelace, et al., "VSAM Demystified", IBM Corp., Document No. SG24-6105-01, Sep. 2003, pp. 1-524.

(Continued)

*Primary Examiner* — Cheryl Lewis
(74) *Attorney, Agent, or Firm* — Rabindranath Dutta; Konrad Raynes Davda & Victor LLP

(57) ABSTRACT

A data structure maintained in a computational device stores how many control areas splits have occurred to store a data set, wherein each control area split causes an addition of a single new control area. A command is received to add a new data record to the data set. A determination is made as to whether adding the new data record to the data set will result in a threshold for control area splits to be exceeded. In response to determining that adding the new data record to the data set will result in the threshold for control area splits to be exceeded, creating at least two new control areas in addition to continuing to use one existing control area for storing the data set.

20 Claims, 8 Drawing Sheets

(56) References Cited

OTHER PUBLICATIONS

G.H. Sockut, et al., "Online Reorganization of Databases", IBM Silicon Valley Laboratory, ACM Computing Surveys, vol. 41, No. 3, Article 14, Jul. 2009, pp. 1-136.

"Database User's Guide Version 1 Release1", IBM Corp., z/Transaction Processing Facility Edition, Copyright IBM Corp. 2005, 2011, pp. 1-16.

Notice of Allowance dated Jun. 8, 2012 for U.S. Appl. No. 12/834,648, filed Jul. 12, 2010 by D.L. Lehr, F.E. McCune, D.C. Reed and M.D. Smith.

US Patent Application Serial No. Unknown, filed Jun. 26, 2012, entitled "Processing of Splits of Control Areas and Control Intervals", by inventors D.L.Lehr, F.E. McCune, D.C. Reed and M.D. Smith.

Office Action dated Oct. 4, 2012, pp. 1-14, for U.S. Appl. No. 13/533,650, filed Jun. 26, 2012, by inventors D.L.Lehr, F.E. McCune, D.C. Reed and M.D. Smith.

Office Action dated Oct. 1, 2012, pp. 1-14, for U.S. Appl. No. 13/533,672, filed Jun. 26, 2012, by inventors D.L.Lehr, F.E. McCune, D.C. Reed and M.D. Smith.

Response dated Jan. 2, 2013, pp. 1-2, to Office Action dated Oct. 1, 2012, pp. 1-14, for U.S. Appl. No. 13/533,672, filed Jun. 26, 2012, by inventors D.L.Lehr, F.E. McCune, D.C. Reed and M.D. Smith.

Response dated Jan. 4, 2013, pp. 1-2, to Office Action dated Oct. 4, 2012, pp. 1-13, for U.S. Appl. No. 13/533,650, filed Jun. 26, 2012, by inventors D.L.Lehr, F.E. McCune, D.C. Reed and M.D. Smith.

Notice of Allowance dated Jan. 18, 2013 for U.S. Appl. No. 13/533,672, filed Jun. 26, 2012, by inventors D.Llehr, F.E. McCUNE, D.C. Reed and M.D. Smith, (18.360C3).

Notice of Allowance dated Jan. 23, 2013 for U.S. Appl. No. 13/533,650, filed Jun. 26, 2012 by inventor, D. Llehr, F.E. McCUNE, D C. Reed and M.D. Smith, (18.360C2).

\* cited by examiner

PROCESSING OF SPLITS OF CONTROL AREAS AND CONTROL INTERVALS

CROSS-REFERENCE TO RELATED APPLICATIONS

This application is a continuation of application Ser. No. 12/834,648 filed on Jul. 12, 2010 now U.S. Pat. No. 8,290,987, which is incorporated herein by reference in its entirety.

BACKGROUND

1. Field

The disclosure relates to a method, a system, and a computer program product for the processing of splits of control areas and control intervals.

2. Background

Certain storage access methods may be used to access data stored in direct access storage devices. Data sets stored in direct access storage devices to which such storage access methods may be applicable may have certain characteristics. In such data sets, records may be placed into a data component based on the key value of the records. In certain situations, the records may be placed in ascending key value into the data component.

A control interval (CI) is a contiguous area of direct access storage that storage access methods use to store data records and control information that describes the data records. A control interval may be formed from one or more records or blocks. A control interval is comprised of records stored from beginning to end and may include free space for inserting or lengthening data records. Additionally, a control area (CA) is formed by two or more control intervals put together into fixed length contiguous areas of direct access storage, i.e., a plurality of control intervals are allocated in a single control area. A data set is stored in one or more control areas. In certain situations a control area may correspond to a cylinder having a plurality of tracks.

Control interval splits and control area splits occur as a result of data record insertions or as a result of an increase in the length of an already existing record. If a record is to be inserted (in key sequence) and there is not enough free space in the control interval, the control interval is split into two, i.e., a new free control interval is added to an originally existing control interval. Approximately half of the records in the originally existing control interval may be transferred to the new free control interval. The system then has two control intervals which are both about half empty, and the record to be inserted may be placed in the originally existing control interval. If more records are added to these control intervals and these control intervals fill up again, then the control interval splits may occur once again. It may be noted that as a result of a control interval split, the new control interval is allocated within the same control area in which the originally existing control interval is allocated.

If there are no free control intervals in an originally existing control area and a data record is to be inserted, a control area split occurs. As a result of the control area split, a single new control area is added to the originally existing control area for creating new space for the data record to be inserted. Therefore, the control area split results in two control areas being available to store data records instead of the single originally existing control area. Approximately half of the control intervals may be transferred to the single new control area and the other half may be stored in the originally existing control area. This movement creates space for new control intervals in the originally existing control area, and the record to be inserted may cause a control interval split for storing the record.

SUMMARY OF THE PREFERRED EMBODIMENTS

Provided are a method, a system, and a computer program product in which a data structure maintained in a computational device stores how many control areas splits have occurred to store a data set, wherein each control area split causes an addition of a single new control area. A command is received to add a new data record to the data set. A determination is made as to whether adding the new data record to the data set will result in a threshold for control area splits to be exceeded. In response to determining that adding the new data record to the data set will result in the threshold for control area splits to be exceeded, creating at least two new control areas in addition to continuing to use one existing control area for storing the data set.

In further embodiments, the one existing control area has an existing plurality of control intervals allocated to the one existing control area. A new control interval is created. A splitting of the existing plurality of control intervals and the newly created control interval to generate a new plurality of control intervals is performed. The new plurality of control intervals are distributed among the at least two new control areas and the one existing control area, wherein each of the new plurality of control areas has at least some empty space.

In further embodiments, the one existing control area has an existing plurality of control intervals allocated to the one existing control area. A new control interval is created. The new control interval and the existing plurality of control intervals are distributed among the at least two new control areas and the one existing control area.

In certain embodiments, each control interval corresponds to a block and each control area corresponds to a cylinder. The new data record is placed into a data component based on a key value of the new data record, and the at least two new control areas are four in number, wherein four is a predetermined number indicated by a user.

In additional embodiments, by creating the at least two new control areas in addition to continuing to use the one existing control area, in comparison to creating only one new control area in addition to continuing to use the one existing control area, a fewer number of updates corresponding to control area splits are needed to a catalog stored in the computational device. In certain embodiments, the threshold is a first threshold that further indicates a rate at which control area splits occur, and in response to a reduction in a rate of control area splits below a second threshold, the operation of creating the at least two new control areas is stopped and an operation is started to create only one new control area in addition to continuing to use the one existing control area.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Control interval splits and control area splits may add to the overhead of inserting data records. For example, whenever a control area split occurs, the high used relative byte address may also have to be updated in a catalog in the storage access mechanism and as a result processing time requirements are increased. In certain embodiments, instead of adding a single control interval or a single control area during a split, previous splits are analyzed to determine if an area is likely to be split again. If an area is likely to split relatively soon, then multiple control intervals and multiple control areas are added during control area split processing and existing records are distributed across these multiple control intervals and control areas. As a result, splits are necessary relatively less frequently for such areas, in comparison to situations in which only a single control interval and/or single control area are added during a split, and processing time requirements may be lowered.

Exemplary Embodiments

Figure 1:
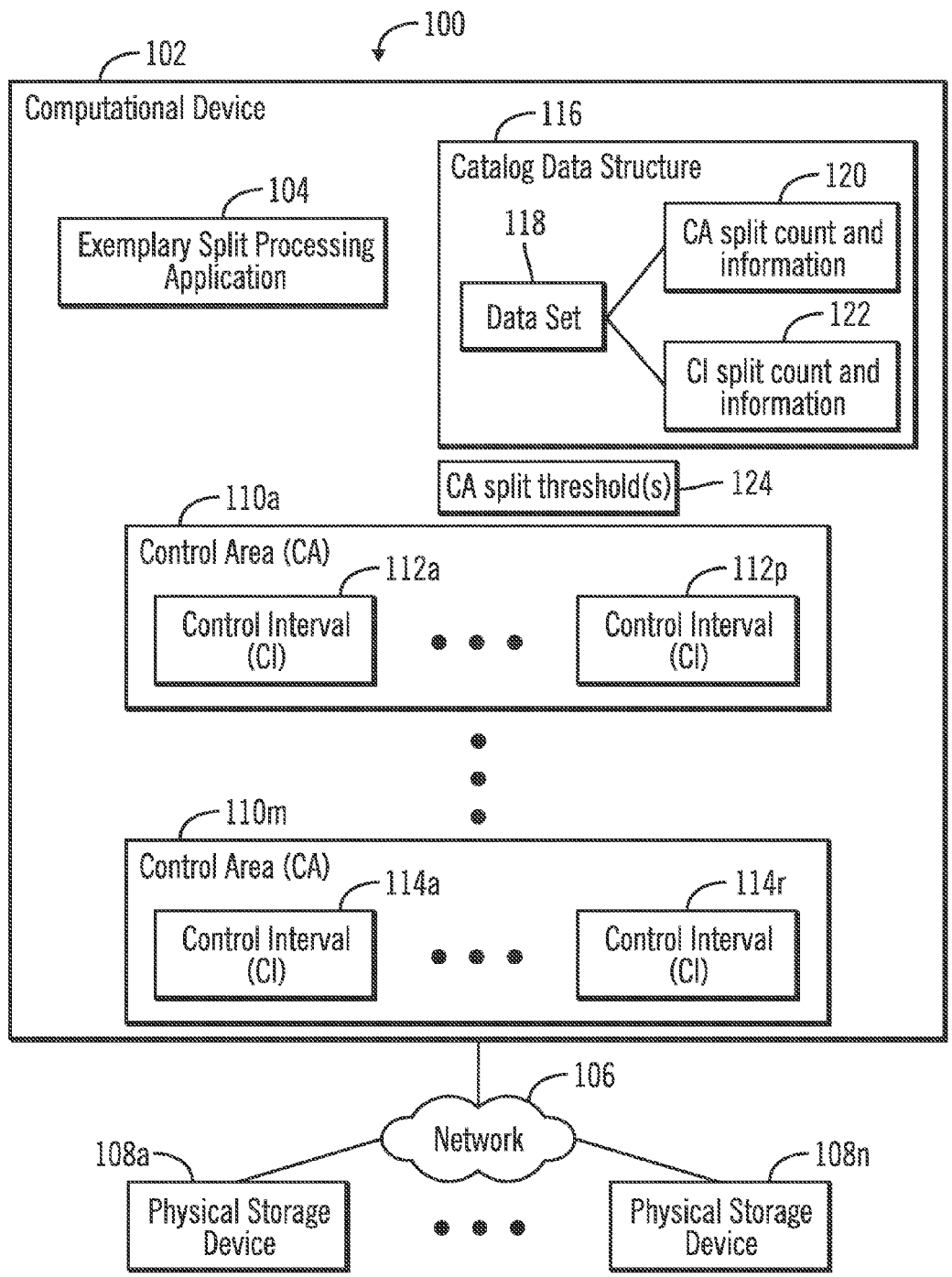
FIG. 1 illustrates a block diagram of a computing environment that includes a computational device implementing an exemplary split processing application, in accordance with certain embodiments.

FIG. 1 illustrates a block diagram of a computing environment 100 that includes a computational device 102 implementing an exemplary split processing application 104, in accordance with certain embodiments.

The computational device 102 may be any suitable device including those presently known in the art, such as, a personal computer, a workstation, a server, a mainframe, a hand held computer, a palm top computer, a telephony device, a network appliance, a blade computer, a storage server, etc. The computational device is coupled via a network 106 or via direct links to a plurality of storage devices 108a . . . 108n.

The exemplary split processing application 104 manages data structures for one or more control areas 110a . . . 110m corresponding to storage maintained in one or more of the physical storage devices 108a . . . 108n. Each of the one or more control areas 110a . . . 110m has one or more control intervals, such as control intervals 112a . . . 112p, 114a . . . 114r. In certain exemplary embodiments, an exemplary control area may correspond to a disk and an exemplary control interval may correspond to a block.

The exemplary split processing application 104 also manages a catalog data structure 116 in which corresponding to a data set 118 indicators are maintained for a CA split count 120 and a CI split count 122. The data set 118 may be stored in the control areas 110a . . . 110m. The CA split count 120 indicates how many times control areas corresponding to the data set 118 have been split, whereas the CI split count 122 may indicate how many times control intervals corresponding to the data set 118 have been split. Additional information on splits may also be stored with the CA split count 120 and the CI split count 122. While FIG. 1 shows a single data set 118, in alternative embodiments the exemplary split processing application 104 may manage a catalog data structure 116 having CA splits counts and CI split counts for a plurality of data sets.

Additionally, the exemplary split processing application 104 also manages a data structure that indicates one or more CA split thresholds 124. The CA split threshold 124 may indicate for a selected data set, a threshold for the rate of control area splits for the selected data set. In certain embodiments, in response to the exemplary split processing application 104 determining that adding a new data record to the data set 118 will result in the threshold 124 for control area splits to be exceeded, at least two new control areas are added in addition to continued usage of one existing control area for storing the data set. For example, in certain exemplary embodiments by creating three new control areas, a single existing control area may be split into four control areas.

Figure 2:
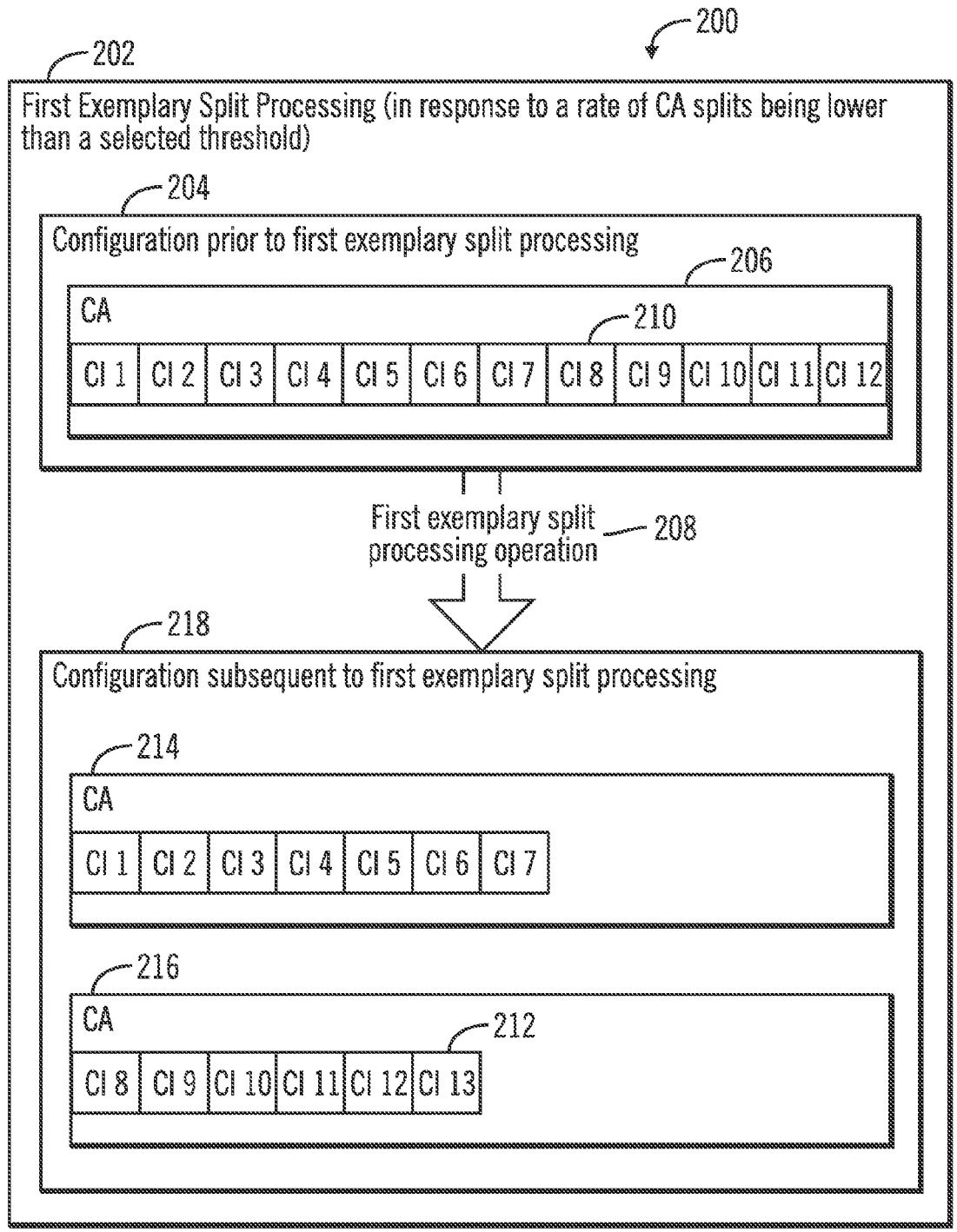
FIG. 2 illustrates a block diagram that shows how first exemplary split processing operations may occur when a rate of control area splits is below a selected threshold, in accordance with certain embodiments.

FIG. 2 illustrates a block diagram 200 that shows how first exemplary split processing 202 may occur in response to a rate of occurrence control area splits being lower than a selected threshold, in accordance with certain embodiments. The first exemplary split processing mechanism shown in FIG. 2 may be performed by the exemplary split processing application 104 when the rate of occurrence of control areas splits is lower than a selected threshold.

In FIG. 2, a configuration 204 of a control area 206 is shown prior to an execution of a first exemplary split processing operation 208. The control area 206 has twelve control intervals 210 shown as CI 1, CI 2, CI 3, CI 4, CI 5, CI 6, CI 7, CI 8, CI 9, CI 10, CI 11, CI 12.

When a command is received to add a new data record to the control area 206, the control area 206 may not be able to accommodate the new data record area in the twelve control intervals 210 and there is no additional space in the control area 206. In certain embodiments, in which the rate of control area splits that have been occurring in the past is lower than a selected threshold, a new control interval CI 13 (shown via reference numeral 212) is added as a result of the first exemplary split processing operation 208 after the control area 206 has been split into two control areas 214, 216 by creating a new control area 216. The control intervals CI 1, CI 2, CI 3, CI 4, CI 5, CI 6, CI 7, CI 8, CI 9, CI 10, CI 11, CI 12, CI 13 are divided up as evenly as possible among the two control areas 214, 216. The control area 214 shown in the configuration 218 subsequent to the first exemplary split processing operation 208 is the same as the control area 206, except for having about half the number of control intervals stored in the control area 206, wherein roughly the other half of control intervals have been moved to the newly created control area 216.

Therefore, FIG. 2 shows certain embodiments in which an existing control area 206 has an existing plurality of control intervals 210 allocated to the one existing control area 206. A new control area 216 is created when a data record cannot be accommodated into the existing control area 206. A single new control interval 212 is created, and the new control interval 212 and the existing plurality of control intervals 210 are distributed between the new control area 216 and the one existing control area, i.e., the control area 206 is split into two control areas 214, 216. The split processing shown in FIG. 2 is performed when relatively few control area splits (e.g., a rate of control area splits is below a selected threshold) have been occurring for a data set.

Figure 3:
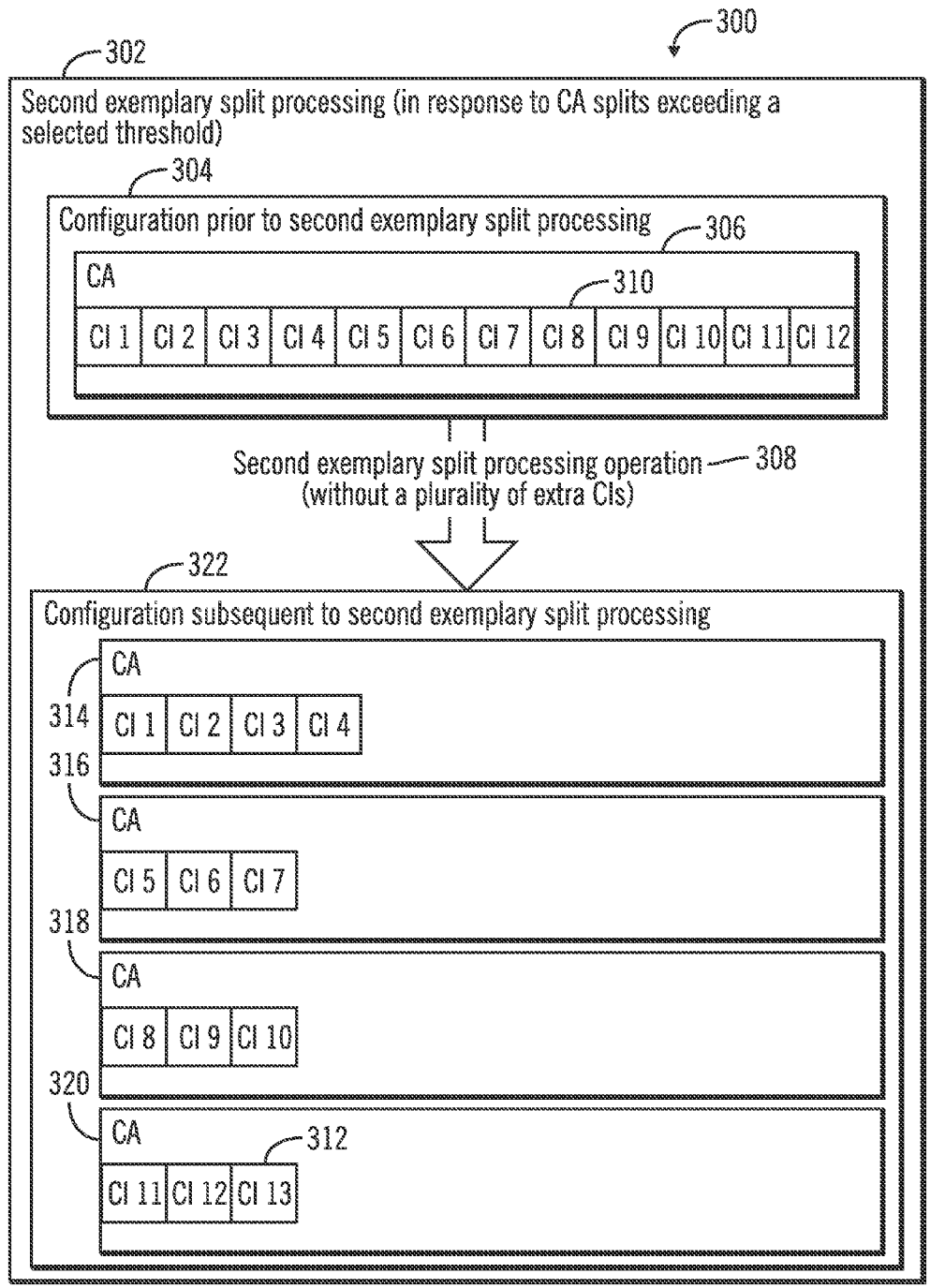
FIG. 3 illustrates a block diagram that shows how second exemplary split processing operations may occur when a rate of control area splits is above a selected threshold, wherein a plurality of extra control intervals are not implemented, in accordance with certain embodiments.

FIG. 3 illustrates a block diagram 300 that shows how a second exemplary split processing 302 may occur when a rate of control area splits is above a selected threshold, wherein a plurality of extra control intervals are not implemented, in accordance with certain embodiments. The second exemplary split processing mechanism shown in FIG. 3 may be performed by the exemplary split processing application 104 when the rate of occurrence of control areas splits exceeds a selected threshold.

In FIG. 3, a configuration 304 of a control area 306 is shown prior to an execution of the second split processing operation 308. The control area 306 has twelve control intervals 310 shown as CI 1, CI 2, CI 3, CI 4, CI 5, CI 6, CI 7, CI 8, CI 9, CI 10, CI 11, CI 12.

When a command is received to add a new data record to the control area 306, the control area 306 may not be able to accommodate the new data record area in the twelve control intervals 310 and there is no additional space in the control area 306. In certain embodiments in which the rate of control splits that have been occurring in the past is higher than a selected threshold, a new control interval CI 13 (shown via reference numeral 312) is added as a result of the second exemplary split processing operation 308 after the control area 306 is split into four control areas 314, 316, 318, 320 by creating three new control area 316, 318, 320. The control intervals CI 1, CI 2, CI 3, CI 4, CI 5, CI 6, CI 7, CI 8, CI 9, CI 10, CI 11, CI 12, CI 13 are divided up as evenly as possible among the four control areas 314, 316, 318, 320. The control area 314 shown in the configuration 322 subsequent to the second exemplary split processing operation 308 is the same as the control area 306, except for having roughly a quarter of the number of control intervals stored in the control area 306, wherein roughly the other three quarters of control intervals have been moved to the newly created control areas 316, 318, 320.

Therefore, FIG. 3 shows certain embodiments in which an existing control area 306 has an existing plurality of control intervals 310 allocated to the one existing control area 306. Three new control areas 316, 318, 320 are created when a data record cannot be accommodated into the existing control area 306. A single new control interval 312 is created, and the new control interval 312 and the existing plurality of control intervals 310 are distributed among the new control areas 316, 318, 320 and the one existing control area, i.e., the control area 306 is split into four control areas 314, 316, 318, 320. The second exemplary split processing shown in FIG. 3 is performed when relatively many control area splits (e.g., a rate of control area splits above a selected threshold) have been occurring for a data set.

Figure 4:
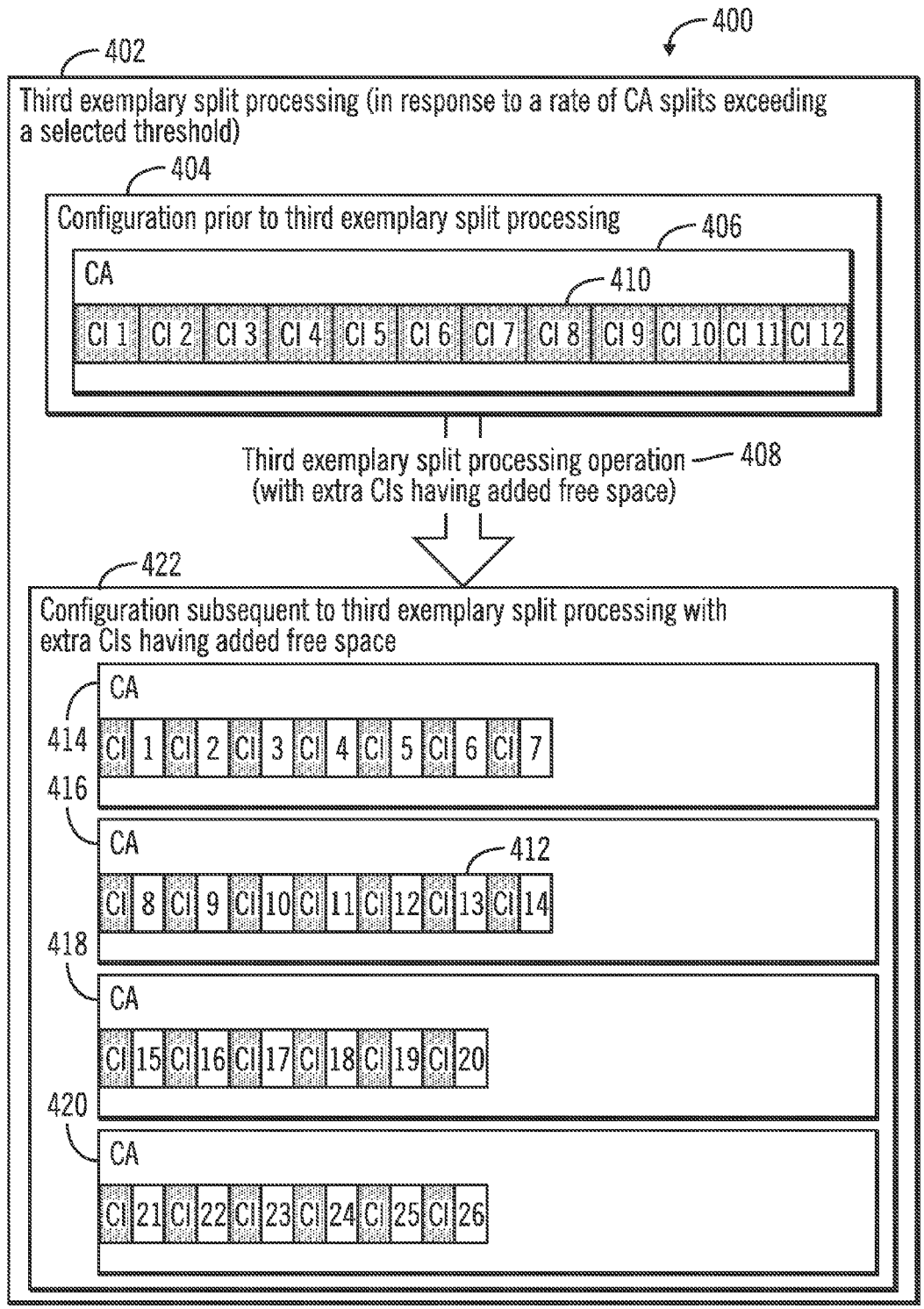
FIG. 4 illustrates a block diagram that shows how third exemplary split processing operations may occur when a rate of control area splits is above a selected threshold, wherein a plurality of control intervals having added free space are implemented, in accordance with certain embodiments.

FIG. 4 illustrates a block diagram 400 that shows how a third exemplary split processing 402 may occur when a rate of control area splits is above a selected threshold, wherein a plurality of extra control intervals are implemented, in accordance with certain embodiments. The third exemplary split processing mechanism shown in FIG. 4 may be performed by the exemplary split processing application 104 when the rate of occurrence control areas splits exceeds a selected threshold.

In FIG. 4, a configuration 404 of a control area 406 is shown prior to an execution of the third split processing operation 408. The control area 406 has twelve control intervals 410 shown as CI 1, CI 2, CI 3, CI 4, CI 5, CI 6, CI 7, CI 8, CI 9, CI 10, CI 11, CI 12.

When a command is received to add a new data record to the control area 406, the control area 406 may not be able to accommodate the new data record area in the twelve control intervals 410. In certain embodiments, in which the rate of control splits exceeds a selected threshold, a new control interval CI 13 (shown via reference numeral 412) is added as a result of the third exemplary split processing operation 408 after the control area 406 has been split into four control areas 414, 416, 418, 420 by creating three new control area 416, 418, 420. Each of the control intervals CI 1, CI 2, CI 3, CI 4, CI 5, CI 6, CI 7, CI 8, CI 9, CI 10, CI 11, CI 12, CI 13 are then split to generate twenty six control intervals CI 1, CI 2, CI 3, CI 4, CI 5, CI 6, CI 7, CI 8, CI 9, CI 10, CI 11, CI 12, CI 13, CI 14, CI 15, CI 16, CI 17, CI 18, CI 19, CI 20, CI 21, CI 22, CI 23, CI 24, CI 25, CI 26 and these twenty six control intervals are then divided up as evenly as possible among the four control areas 414, 416, 418, 420. The data included in the data set is distributed among the twenty six control intervals, and each of the twenty six control intervals may be half empty (e.g., in FIG. 4 the shaded areas of the control intervals are full and the areas that are not shaded are empty), wherein in the empty space additional data records may be stored.

The control area 414 shown in the configuration 422 subsequent to the third exemplary split processing operation 408 is the same as the control area 406. Additionally, because of the splitting of each of the control areas and the control intervals, each of the twenty six control intervals may be about half empty. The control intervals may then have space for additional records without having to go through split processing later on. This may reduce the overall amount of free space in the new control areas, but each control interval will have more space. The overall amount of space for record inserts will remain the same.

Therefore, FIG. 4 shows certain embodiments in which an existing control area 406 has an existing plurality of control intervals 410 allocated to the one existing control area 406. Three new control areas 416, 418, 420 are created when a data record cannot be accommodated into the existing control area 406. A single new control interval 412 is created, and the new control interval 412 and the existing plurality of control intervals 410 are each split and then are distributed among the new control areas 416, 418, 420 and the one existing control area, i.e., the control area 406 is split into four control areas 414, 416, 418, 420 and each of the control intervals are also split. The third exemplary split processing shown in FIG. 4 is performed when relatively many control area splits (e.g., a rate of control area splits above a selected threshold) have been occurring for a data set. By splitting each of the control intervals in addition to splitting the control areas into four, a fewer number of control area and control interval splits may be needed to accommodate data records that are added subsequently, and system performance may be enhanced.

Figure 5:
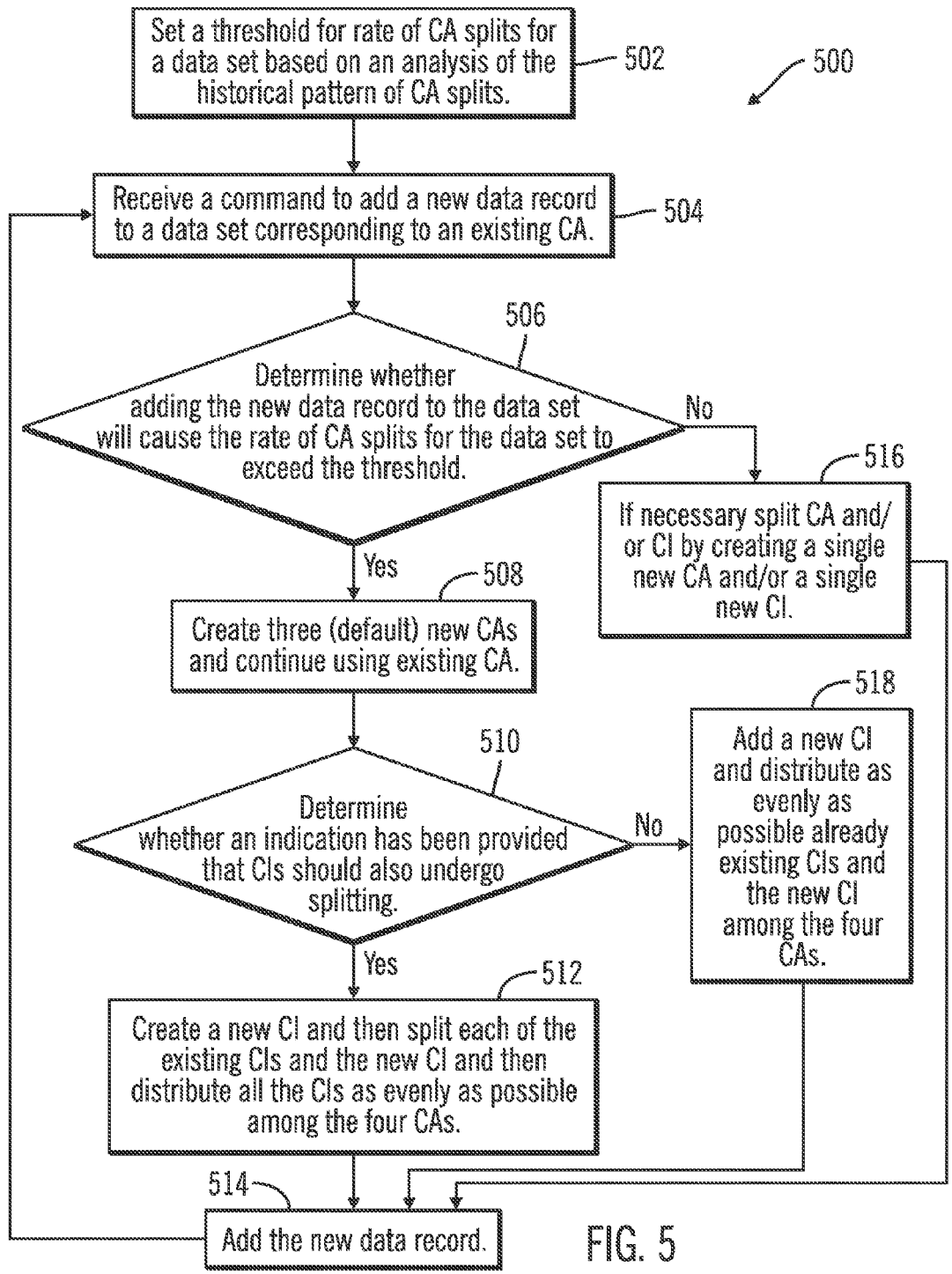
FIG. 5 illustrates a flowchart that shows first operations, in accordance with certain embodiments.

FIG. 5 illustrates a flowchart that shows first operations 500, in accordance with certain embodiments. The operations shown in FIG. 5 may be implemented by the exemplary split processing application 104 implemented in the computational device 102.

Control starts at block 502, in which the exemplary split processing application 104 may be used to configure the CA split threshold 124 (shown in FIG. 1) to indicate a threshold for the rate of control area splits beyond which a single control area is configured to be split into more than two control areas. For example, the threshold may be set to two control area splits per hour, and if two control area splits have already occurred and a third control area split is needed within a period of an hour, then while performing the third control area split, the existing control area may be split into four control areas instead of being split into two control areas. The threshold may be based on the historical effect of control area splits on system performance. For example, it may be observed that control area splits beyond a certain rate has a material effect on decreasing system performance and the CA split threshold 124 is adjusted such that by splitting a control area into four control areas the system performance may be enhanced.

Control proceeds to block 504, in which the exemplary split processing application 104 receives a command to add a new data record to a data set 118 (shown in FIG. 1) corresponding to an existing control area (e.g. control area 406 of FIG. 4). The exemplary split processing application 104 determines (at block 506) whether adding the new data record to the data set 118 will cause the rate of control area splits for the data set to exceed the threshold. If so, then the exemplary split processing application 104 creates (at block 508) three new control areas and continues to use the existing control area, i.e., the existing control area is split into four control areas. In alternative embodiments, an existing control area may be split into any number of control areas greater than two. The number of control areas into which the existing control area may be split may be a predetermined number indicated by an administrator or a user, or may be calculated based on the rate at which control area splits have been occurring. For example, if control area splits have been occurring at a very high rate, the existing control area may be split into eight control areas, whereas if control area splits have been occurring at a moderately high rate, the existing control area may be split into four control areas.

Control proceeds to block 510 in which the exemplary split processing application 104 determines whether an indication has been provided that control intervals should also undergo splitting. If so, the exemplary split processing application 104 creates (at block 512) a new control interval (also shown by reference numeral 412 in FIG. 4) and then splits each of the existing control intervals and the new control interval and then distributes all the control intervals as evenly as possible among the four control areas (also shown by reference numerals 414, 416, 418, 420 in FIG. 4). The new data record is added (at block 514) and control returns to block 504.

If the exemplary split processing application 104 determines (at block 506) that adding the new data record to the data set 118 will not cause the rate of control area splits for the data set to exceed the threshold, then control proceeds to block 516 in which if necessary the exemplary split processing application 104 splits control areas and/or control intervals by creating a single new control area and/or a single new control interval (also shown in FIG. 2 in which a control area is split into two), and control proceeds to block 514 in which the new data record is added.

If the exemplary split processing application 104 determines (at block 510) that an indication has not been provided that control intervals should also undergo splitting, then control proceeds to block 518, in which a new control interval is added and the already existing control intervals and the new control interval are distributed as evenly as possible among the four control areas, and control proceeds to block 514 in which a new data record is added.

Therefore FIG. 5 illustrates certain embodiments in which based on a predetermined threshold an existing control area may be split into more than two control areas. In certain embodiments each of the existing and new control intervals may also be split while splitting a control area into more than two control areas.

Figure 6:
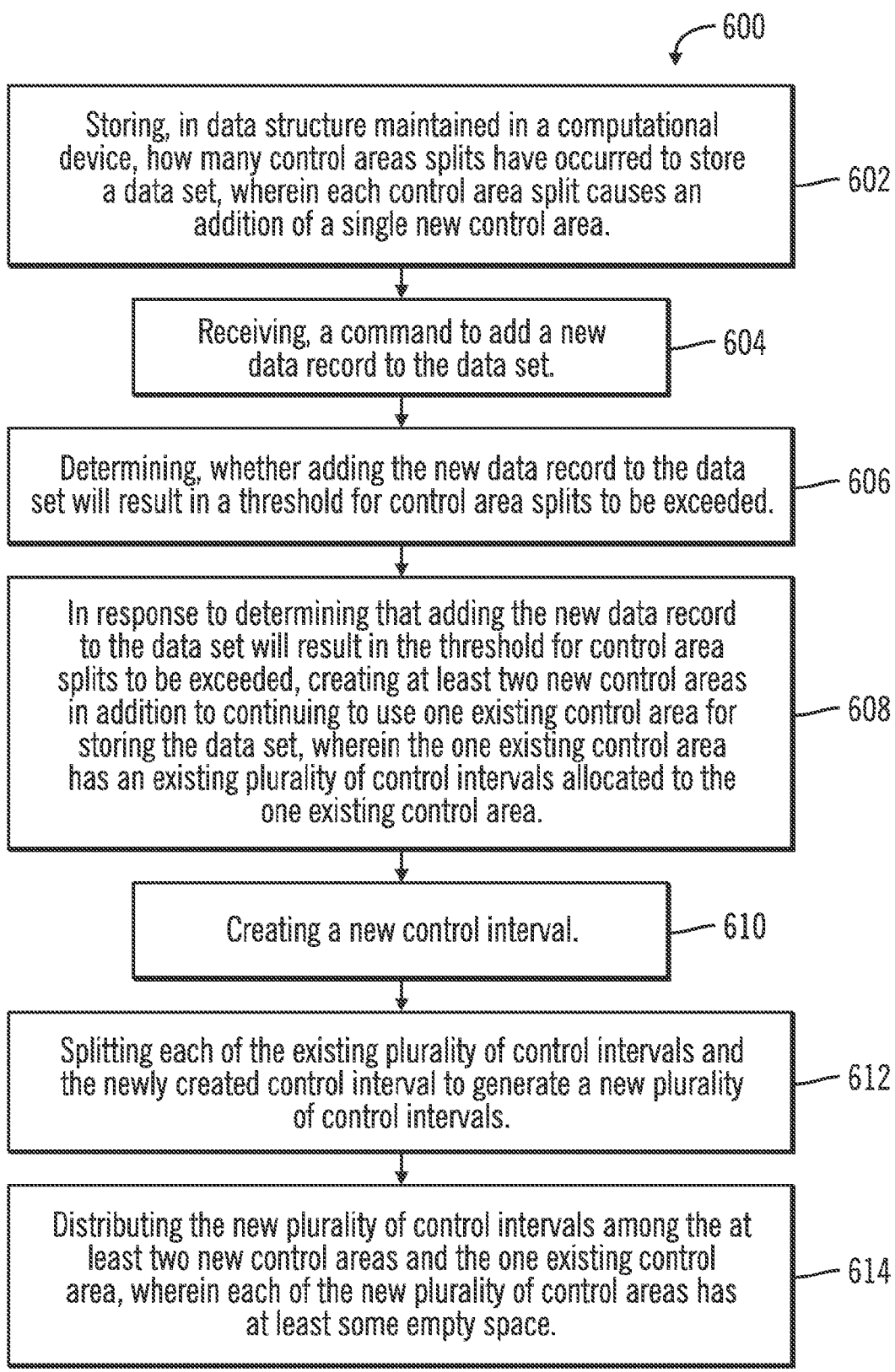
FIG. 6 illustrates a flowchart that shows second operations, in accordance with certain embodiments.

FIG. 6 illustrates a flowchart that shows second operations 600, in accordance with certain embodiments. The operations shown in FIG. 6 may be implemented by the exemplary split processing application 104 implemented in the computational device 102.

Control starts at block 602 in which a data structure 116 maintained in a computational device 102 stores how many control areas splits have occurred to store a data set, wherein each control area split causes an addition of a single new control area. A command is received (at block 604) to add a new data record to the data set.

A determination is made (at block 606) as to whether adding the new data record to the data set will result in a threshold 124 for control area splits to be exceeded. In response to determining that adding the new data record to the data set will result in the threshold for control area splits to be exceeded, at least two new control areas are created (at block 608) in addition to continuing to use one existing control area for storing the data set, wherein the one existing control area has an existing plurality of control intervals allocated to the one existing control area.

Control proceeds to block 610 in which a new control interval is created. A splitting of the existing plurality of control intervals and the newly created control interval is performed to generate (at block 612) a new plurality of control intervals. The new plurality of control intervals are distributed (at block 614) among the at least two new control areas and the one existing control area, wherein each of the new plurality of control areas has at least some empty space.

Therefore FIG. 6 illustrates certain embodiments, in which based on a threshold, at least two new control areas may be created to add to an existing control area, wherein each of existing and new control intervals may be split while creating the at least two new control areas.

Figure 7:
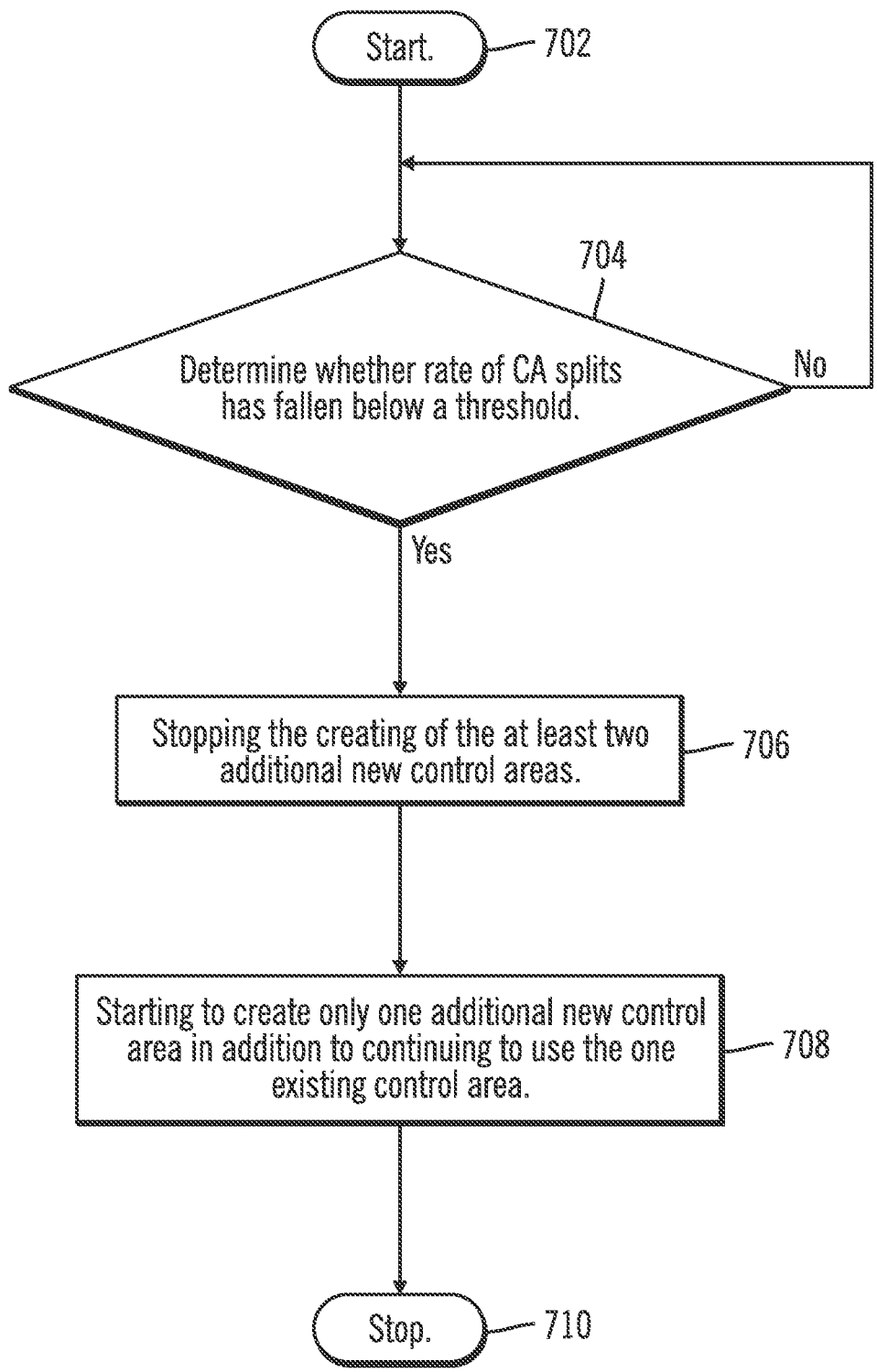
FIG. 7 illustrates a flowchart that shows third operations, in accordance with certain embodiments.

FIG. 7 illustrates a flowchart that shows third operations 700, in accordance with certain embodiments. The operations shown in FIG. 7 may be implemented by the exemplary split processing application 104 implemented in the computational device 102.

Control starts (at block 702) and the exemplary split processing application 104 determines (at block 704) whether a rate of control area splits has fallen below a threshold, wherein the threshold may be the same or different from the threshold used in the operations shown in block 606, 608 of FIG. 6. If the rate of control area splits has fallen below a threshold, then the exemplary split processing application 104 stops (at block 706) the creating of the at least two new control areas and then starts (at block 708) to create only one new control area in addition to continuing to use the one existing control area before stopping (at block 710) the process.

Therefore, FIG. 7 illustrates certain embodiments in which in response to a reduction in a rate of control area splits below a selected threshold, the operation of creating the at least two new control areas is stopped and an operation is started to create only one new control area in addition to continuing to use the one existing control area.

FIGS. 1-7 illustrate certain embodiments in which rather than generating only one additional control area, certain embodiments generate more than one additional control areas when a new data record that cannot be accommodated into an existing area is inserted into a data set, if the rate of splitting of control areas exceeds a predetermined threshold.

In certain embodiments, when more than one new control areas are generated, not only is a new control interval generated but each of existing control intervals and the new control interval are also split and existing data distributed among the control intervals. As a result, the frequency of occurrence of control area and control interval splits is reduced and system performance may be enhanced in comparison to the situation in which only one additional control area and/or only one control interval are generated.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Sun Microsystems, Inc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
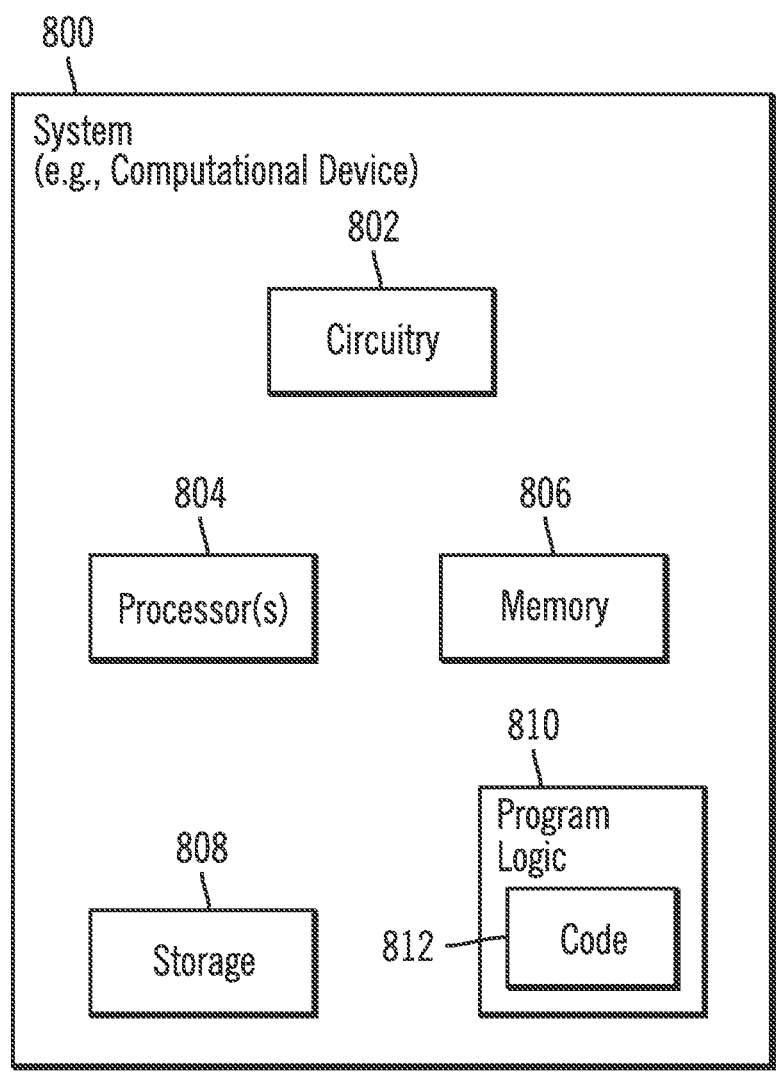
FIG. 8 illustrates a block diagram of a computational system that shows certain elements that may be included in the computational device of FIG. 1, in accordance with certain embodiments.

FIG. 8 illustrates a block diagram that shows certain elements that may be included in the system 800 in accordance with certain embodiments. The system 800 may comprise the computational device 102 and may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

In certain embodiments, the computational device 102 and the physical storage devices 108a . . . 108n of FIG. 1 may be cloud component parts included in a cloud computing environment. In the cloud computing environment the systems architecture of the hardware and software components involved in the delivery of cloud computing may involve a plurality of cloud components communicating with each other.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    storing, in data structure maintained in a computational device, how many control areas splits have occurred to store a data set, wherein each control area split causes an addition of a single new control area;
    receiving, a command to add a new data record to the data set;
    determining, whether adding the new data record to the data set will result in a threshold for control area splits to be exceeded; and
    in response to determining that adding the new data record to the data set will result in the threshold for control area splits to be exceeded, creating at least two new control areas in addition to continuing to use one existing control area for storing the data set.

2. The method of claim 1, wherein the one existing control area has an existing plurality of control intervals allocated to the one existing control area.

3. The method of claim 2, the method further comprising:
    creating a new control interval; and
    distributing the new control interval and the existing plurality of control intervals among the at least two new control areas and the one existing control area.

4. The method of claim 3, wherein each control interval corresponds to a block, and wherein each control area corresponds to a cylinder.

5. The method of claim 1, wherein by creating the at least two new control areas in addition to continuing to use the one existing control area, in comparison to creating only one new control area in addition to continuing to use the one existing control area, a fewer number of updates corresponding to control area splits are needed to a catalog stored in the computational device.

6. The method for deploying computing infrastructure of claim 1, wherein by creating the at least two new control areas in addition to continuing to use the one existing control area, in comparison to creating only one new control area in addition to continuing to use the one existing control area, a fewer number of updates corresponding to control area splits are needed to a catalog stored in the computational device.

7. A system, comprising:
    a memory; and
    a processor coupled to the memory, wherein the processor performs operations, the operations comprising:
    storing, in data structure maintained in a computational device, how many control areas splits have occurred to store a data set, wherein each control area split causes an addition of a single new control area;
    receiving, a command to add a new data record to the data set;

determining, whether adding the new data record to the data set will result in a threshold for control area splits to be exceeded; and in response to determining that adding the new data record to the data set will result in the threshold for control area splits to be exceeded, creating at least two new control areas in addition to continuing to use one existing control area for storing the data set.

8. The system of claim 7, wherein the one existing control area has an existing plurality of control intervals allocated to the one existing control area.

9. The system of claim 8, the operations further comprising:

creating a new control interval; and distributing the new control interval and the existing plurality of control intervals among the at least two new control areas and the one existing control area.

10. The system of claim 9, wherein each control interval corresponds to a block, and wherein each control area corresponds to a cylinder.

11. The system of claim 7, wherein by creating the at least two new control areas in addition to continuing to use the one existing control area, in comparison to creating only one new control area in addition to continuing to use the one existing control area, a fewer number of updates corresponding to control area splits are needed to a catalog stored in the computational device.

12. A computer program product, the computer program product comprising:

a computer readable storage medium having computer readable program code embodied therewith, the computer readable program code configured to perform operations, the operations comprising:

storing, in data structure maintained in a computational device, how many control areas splits have occurred to store a data set, wherein each control area split causes an addition of a single new control area;

receiving, a command to add a new data record to the data set;

determining, whether adding the new data record to the data set will result in a threshold for control area splits to be exceeded; and in response to determining that adding the new data record to the data set will result in the threshold for control area splits to be exceeded, creating at least two new control areas in addition to continuing to use one existing control area for storing the data set.

13. The computer program product of claim 12, wherein the one existing control area has an existing plurality of control intervals allocated to the one existing control area.

14. The computer program product of claim 13, the operations further comprising:

creating a new control interval; and distributing the new control interval and the existing plurality of control intervals among the at least two new control areas and the one existing control area.

15. The computer program product of claim 14, wherein each control interval corresponds to a block, and wherein each control area corresponds to a cylinder.

16. The computer program product of claim 12, wherein by creating the at least two new control areas in addition to continuing to use the one existing control area, in comparison to creating only one new control area in addition to continuing to use the one existing control area, a fewer number of updates corresponding to control area splits are needed to a catalog stored in the computational device.

17. A method for deploying computing infrastructure, comprising integrating computer-readable code into a computational device, wherein the code in combination with the computational device performs operations, the operations comprising:

storing, in data structure maintained in a computational device, how many control areas splits have occurred to store a data set, wherein each control area split causes an addition of a single new control area;

receiving, a command to add a new data record to the data set;

determining, whether adding the new data record to the data set will result in a threshold for control area splits to be exceeded; and in response to determining that adding the new data record to the data set will result in the threshold for control area splits to be exceeded, creating at least two new control areas in addition to continuing to use one existing control area for storing the data set.

18. The method for deploying computing infrastructure of claim 17, wherein the one existing control area has an existing plurality of control intervals allocated to the one existing control area.

19. The method for deploying computing infrastructure of claim 18, the operations further comprising:

creating a new control interval; and distributing the new control interval and the existing plurality of control intervals among the at least two new control areas and the one existing control area.

20. The method for deploying computing infrastructure of claim 19, wherein each control interval corresponds to a block, and wherein each control area corresponds to a cylinder.

* * * * *